United States Patent [19]

Riggle

[11] Patent Number: 5,279,399
[45] Date of Patent: Jan. 18, 1994

[54] ONE-WAY ROLLER CLUTCH

[75] Inventor: John F. Riggle, Aurora, Ill.

[73] Assignee: Borg-Warner Automotives, Inc., Sterling Heights, Mich.

[21] Appl. No.: 986,944

[22] Filed: Dec. 8, 1992

[51] Int. Cl.⁵ .................................................. F16D 41/06
[52] U.S. Cl. ..................................... 192/45; 192/113 B
[58] Field of Search ........................... 192/45, 113 LR

[56] References Cited

U.S. PATENT DOCUMENTS

| | | | |
|---|---|---|---|
| 3,011,606 | 12/1961 | Ferris et al. | 192/45 |
| 3,104,744 | 9/1963 | Wade | 192/45 |
| 3,876,047 | 4/1975 | Rist | 192/45 |
| 3,904,005 | 9/1975 | Husmann | 192/45 |
| 3,955,659 | 5/1976 | Ehret et al. | 192/45 |
| 3,972,573 | 8/1976 | Marola | 192/45 X |
| 3,994,377 | 11/1976 | Elmore | 192/45 |
| 4,088,211 | 5/1978 | Doller et al. | 192/45 |
| 4,901,832 | 2/1990 | Werner | 192/42 |
| 4,995,490 | 2/1991 | Kanai | 192/45 |
| 5,101,946 | 4/1992 | Lederman | 192/45 |

FOREIGN PATENT DOCUMENTS 63-235734   9/1988   Japan ..................................... 192/45

Primary Examiner—Richard M. Lorence
Attorney, Agent, or Firm—Reising, Ethington

[57] ABSTRACT

A one-way roller clutch has an inner race, an outer race, a plurality of rollers that are disposed between the races, a phasing cage that pockets each of the rollers individually, and a cage assembly that is keyed to the outer race. The cage assembly anchors a plurality of energizing springs that engage the phasing cage and bias the phasing cage and pocketed rollers toward an engaged position where the rollers are wedged between the races so that one race drives the other.

8 Claims, 1 Drawing Sheet

ONE-WAY ROLLER CLUTCH

BACKGROUND OF THE INVENTION

This invention relates generally to one-way clutches and more particularly to one-way roller clutches that have energizing springs that bias the rollers toward an engaged position where the rollers are wedged between the races so that one race drives the other in one direction.

One-way roller clutches typically have a plurality of energizing springs, generally accordion shaped, that are attached to a cage that is anchored to a cam race. Each spring individually engages and biases one of several rollers toward an engaged position wedged between one of several cam surfaces of the cam race and a cylindrical surface of an associated cylindrical race. See for instance U.S. Pat. No. 3,904,005 granted to Horst Husmann for an Overrunning Clutch Sep. 9, 1975; U.S. Pat. No. 3,955,659 granted to Fritz Ehret and Otto Worner for a Clamping Roller Freewheeling Device May 11, 1976; U.S. Pat. No. 3,994,377 granted to J. Russell Elsmore for an Overruning Clutch Retainer and Roller Assembly Nov. 30, 1976; U.S. Pat. No. 4,088,211 granted to John S. Dollar and Oscar G. Kitchen for a Overrunning Roller Clutch May 9, 1978; and U.S. Pat. No. 4,901,832 granted to Andre G. Werner for a Freewheel Drive Feb. 20, 1990.

The purpose of the energizing springs in applying a spring force to the rollers is to locate the rollers close to an engaged position when the one-way roller clutch is overrunning so that the rollers engage to lock-up the clutch almost immediately upon torque reversal. However, the energizing springs of the typical one-way roller clutches discussed above act independent of each other and consequently there is no guarantee that all rollers will engage at the same time and with the same force. Because of this, one or more rollers may not engage properly and "pop out" or uneven loading among the roller may occur leading to possible raceway brinelling by the highly loaded roller or rollers. It is also difficult to maintain raceway concentricity because some rollers may be wedged further into their cam areas than other rollers. Also failure of just one spring may result in complete clutch failure since one roller is not taking any share of the load.

In another less common, type of one-way roller clutch, the cage is not anchored to the cam race. Instead it is rotated with respect to the cam race to force all the rollers into or out of wedged engagement with the cam surfaces in unison. This "phasing cage" may be rotated by drag springs attached to the cage that ride on the associated cylindrical race or by an external actuator, such as a piston. See for instance, U.S. Pat. No. 5,101,946 granted to Frederick G. Lederman for a Cage Phased Roller Clutch Apr. 7, 1972.

A drawback of the passively actuated type roller clutch is that the drag springs tend to produce either high drag forces in the overrunning mode of operation that lead to excessive wear and high power consumption or light drag forces that lead to a long response time for clutch engagement and possibly no clutch engagement at all.

A drawback of the externally actuated type is that the actuation mechanism adds unnecessary bulk and increases space requirements. Moreover, as a practical matter, the one-way clutch is limited to applications where the cylindrical race free-wheels.

SUMMARY OF THE INVENTION

The object of this invention is to provide a one-way roller clutch that has a plurality of individual energizing springs that act in concert to bias the rollers into wedging engagement with the races.

A feature of the one-way roller clutch according to this invention is that it has a phasing cage for engaging all rollers simultaneously that is actuated by a plurality of individual energizing springs.

Another feature of the one-way roller clutch according to this invention is that it has several energizing springs that act on a phasing cage to engage all the rollers simultaneously.

Another feature of the one-way roller clutch according to this invention is that it has several energizing springs that act on a phasing cage that engages the rollers so that no roller is dependant upon any one spring for engagement.

Yet another feature of the one-way roller clutch according to this invention is that it has several energizing springs that engage the rollers through an intermediary phasing cage so that failure of any one spring does not destroy the roller clutch.

Still another feature of the one-way roller clutch according to this invention is that it has the same number of springs as rollers so that the springs can be packaged efficiently.

Still another feature of the one-way roller clutch according to this invention is that the rollers are engaged through an intermediary phasing cage that is actuated by several springs that do not drag on the cylindrical race and create high drag forces in the overrunning mode of operation.

Still yet another feature of the one-way roller clutch according to this invention is that the rollers are engaged through an intermediary phasing cage that is actuated by several springs that do not depend on spring drag, that do not add unnecessary bulk or space requirements and that do not limit the clutch to applications where the cylindrical race overruns.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
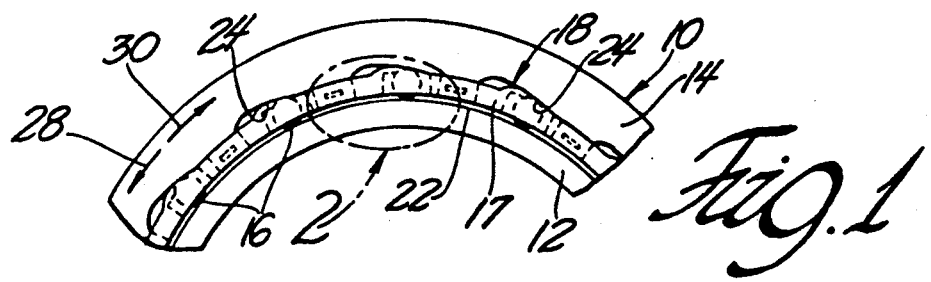
FIG. 1 is a fragmentary front view of a one-way roller clutch in accordance with the invention.

Referring now to the drawing, a one-way roller clutch 10 in accordance with the invention comprises an inner race 12, an outer race 14, a plurality of rollers 16 disposed between the races 12 and 14, a phasing cage 17 that pockets each of the rollers 16 individually, and a cage assembly 18 that is keyed to the outer race. The cage assembly 18 anchors a plurality of energizing springs 20 that engage the phasing cage 17 and bias the rollers 16 toward an engaged position where the rollers 16 are wedged between the races so that one race drives the other.

The inner race 12 has an outer cylindrical surface 22 while the inner surface of the outer race 14 has a plurality of circumferentially spaced clutch cam surfaces 24. The rollers 16 ride on the cylindrical surface 22 and the clutch cam surfaces 24. The rollers 16 are wedged into engagement with these surfaces in response to relative rotation of the outer race 14 with respect to the inner race 12 in the counter-clockwise direction as indicated by the arrow 28 in FIG. 1. Thus the outer race 14 drives the inner race 12 in the counter clockwise direction. Or conversely, the inner race 12 drives the outer race 14 in the clockwise direction.

On the other hand, the rollers 16 back off from wedging engagement with the surfaces 22 and 24 in response to relative rotation of the outer race 14 with respect to the inner race in the clockwise direction as indicated by the arrow 30 in FIG. 1. Thus the outer race 14 overruns the inner race 12, that is free wheels in the clockwise direction, or conversely, the inner race 12 overruns the outer race 14 in the counter clockwise direction.

Figure 2:
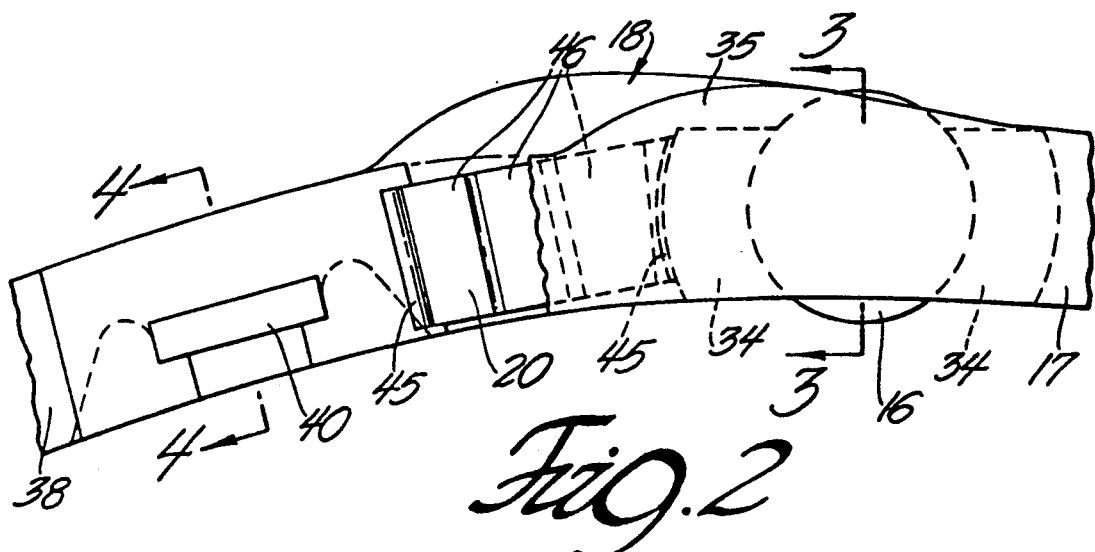
FIG. 2 is a sectioned enlargement of a portion of FIG. 1 showing the relationship of the rollers, the cages and the energizing springs.
Figure 3:
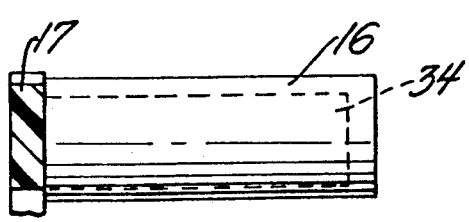
FIG. 3 is a section taken substantially along the line 3—3 of FIG. 2 looking in the direction of the arrows.
Figure 4:
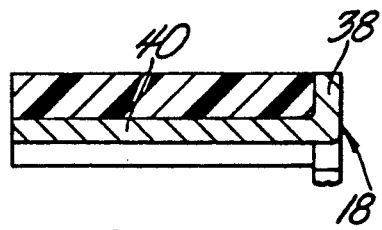
FIG. 4 is a section taken substantially along the line 4—4 of FIG. 2 looking in the direction of the arrows.

The phasing cage 17 comprises a flat end ring 32 that has cantilevered sets of fingers 34 that form individual pockets for each of the rollers 16. Each roller 16 fits between the two fingers of its pocket with a running clearance so that the phasing cage 17 locates and retains each of the rollers 16 in the circumferential direction. Preferably each finger 34 of each set has a curved concave face that confronts a curved concave face of the other finger 34 so that the rollers 16 are retained in the pockets in the radial as well as the circumferential direction. The phasing cage may be made of a plastic material as shown in the drawing or of any other suitable material such as sheet metal. The phasing cage 17 is inserted into one side of the one-way clutch 10 so that it is disposed between the races 12 and 14 and locates the rollers 16 in engagement with the surfaces 22 and 24 as shown in FIG. 2 or in close proximity to these surfaces. The end ring 32 also has a plurality of circumferentially spaced nibs 35 at its outer margin that are disposed in notches in the outer race 14 forming the cam surface 24. The nibs 35 are smaller than the notches so that the phasing cage 17 can move with respect to the outer race 14 in the circumferential direction in order to perform its phasing function. The nibs 35 are not necessary for the phasing function. However, the nibs 35 provide a barrier to lubrication escape from the roller clutch 10 that is a significant advantage in certain applications.

Figure 5:
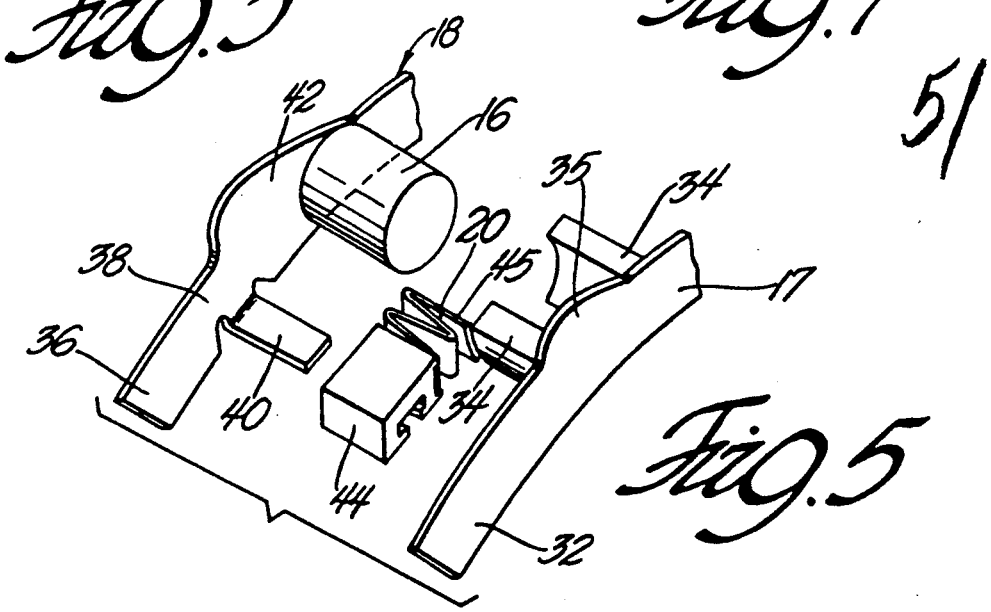
FIG. 5 is an exploded enlargement of a portion of FIG. 1.

The cage assembly 18 includes a sheet metal or plastic cage 36 that comprises a flat end ring 38 that has a plurality of circumferentially spaced fingers 40. The cage assembly 18 is inserted into the opposite side of the one-way clutch 10 so that the fingers 40 are located between the roller pockets formed by the sets of fingers 34 of the phasing cage 17 when the fingers 34 protrude into the annular space between the races 12 and 14. This is best shown in FIGS. 1, 2 and 5. The end ring 36 also has a plurality of circumferentially spaced nibs 42 at its outer margin that fit into the notches in the outer race 14 forming the cam surfaces 24. This anchors or keys the cage assembly 18 to the outer race 14 so that the cage assembly 18 and the outer race 14 rotate together.

The fingers 40 fit into slots of thermoplastic bearing blocks 44 that have axial slots at one end that anchor one end of the energinzing springs 20 so that the other end of the energizing springs 16 engage a finger 34 of each respective roller pocket of the phasing cage 17.

The energizer springs 20 are made from a flat thin strip of resilient metal, such as stainless steel. Each spring 20 has a substantially uniform height as shown in FIGS. 2 and 5 and is generally accordion shaped in plan view as best shown in FIG. 5. The spring 20 has generally parallel end segments 45. One end segment fits in the end slot of the thermoplastic bearing block 44 to anchor the one end of the spring 20 on the cage assembly 18. The other end segment 45 engages finger 34 of the phasing cage 17. The spring 20 has three interconnected slanted leaves 46 between the parallel end segments 45. Other spring shapes having the requisite spring force characteristics are also possible, for example a spring that is accordion shaped in elevation.

In any event, all of the energizing springs 20 act in concert on the phasing cage 17 to bias all of the rollers 16 toward a engaged position with the races 12 and 14. While the cage assembly 18 is shown as a multipiece construction comprising a sheet metal cage and thermoplastic bearing blocks, other constructions are possible. For instance, the cage and bearing blocks may be made of suitable materials other than those illustrated. The cage and bearing blocks may even be made of the same material and/or constructed in one piece, such as a molded thermoplastic cage like the phasing cage 17 that is illustrated. Another possibility is anchoring the energizing springs 20 directly to the cage 36 and eliminating the bearing blocks 44 altogether. In fact the energizing springs 20 may be anchored on the outer cam race 14 and the cage assembly 18 eliminated altogether.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A one-way roller clutch comprising:
an inner race and an outer race having a plurality of rollers disposed between the races;
a phasing cage having a plurality of pockets that locate the rollers individually with respect to the races in a circumferential direction;
a plurality of energizing springs engaging the phasing cage at one end and anchored to another member at the other end whereby all of the energizing springs act in concert on the phasing cage to bias all the rollers toward a clutch engaged position where the rollers are wedged between the races;
one of the races having a plurality of circumferentially spaced clutch cam surfaces that are engaged by the rollers in the clutch engaged position, and
the one-way roller clutch having the same number of springs and rollers.

2. A one-way roller clutch comprising:
an inner race and an outer race having a plurality of rollers disposed between the races;

one of the races having a plurality of circumferentially spaced clutch cam surfaces;

a phasing cage having a plurality of pockets that locate and retain the rollers individually with respect to the races in a circumferential direction;

a plurality of energizing springs anchored to the one rae at one end so that the other end of the springs engage the phasing cage whereby all of the energizing springs act in concert on the phasing cage to bias all the rollers toward a clutch engaged position where the rollers are wedged between the races, and the one-way roller clutch having the same number of springs and rollers.

3. A one-way roller clutch comprising:

an inner race and an outer race having a plurality of rollers disposed between the races;

one of the races having a plurality of circumferentially spaced clutch cam surfaces that are engagable by the rollers;

a phasing cage that has a single end ring disposed on one side of the rollers and a plurality of cantilevered pockets that are disposed between the races and that locate and retain the rollers individually in a circumferential direction;

an anchor cage that has a single end ring disposed on an opposite side of the rollers and a plurality of cantilevered fingers that are disposed between the races in an interdigitated relationship with the cantilevered pockets of the phasing cage, the anchor cage being anchored to the one race, and a plurality of energizing springs anchored to the cantilevered fingers of the anchor cage at one end so that the other end of the springs engage the phasing cage whereby all of the energizing springs act in concert on the phasing cage to bias all the rollers toward a clutch engaged position where the rollers are wedged between the races.

4. A one-way roller clutch comprising:

an inner race and an outer race having a plurality of rollers disposed between the races;

one of the races having a plurality of circumferentially spaced clutch cam surfaces that are engagable by the rollers;

a phasing cage that has an end ring and a plurality of cantilevered pockets that are disposed between the races and that locate and retain the rollers individually in a circumferential direction;

an anchor cage that has an end ring and a plurality of cantilevered fingers that are disposed between the races in an interdigitated relationship with the cantilevered pockets of the phasing cage, the anchor cage being anchored to the one race, a plurality of energizing springs anchored to the cantilevered fingers of the anchor cage at one end so that the other end of the springs engage the phasing cage whereby all of the energizing springs act in concert on the phasing cage to bias all the rollers toward a clutch engaged position where the rollers are wedged between the races, and the plurality of energizing springs and the plurality of rollers being the same in number.

5. The one-way roller clutch as defined in claim 4 wherein the one race is the outer race.

6. A one-way roller clutch comprising:

an inner race and an outer race having a plurality of rollers disposed between the races;

one of the races having a plurality of circumferentially spaced clutch cam surfaces that are engagable by the rollers;

a phasing cage that has an end ring and a plurality of cantilevered pockets that are disposed between the races and that locate and retain the rollers individually in a circumferential direction;

an anchor cage that has an end ring and a plurality of cantilevered fingers that are disposed between the races in an interdigitated relationship with the cantilevered pockets of the phasing cage, the anchor cage being anchored to the one race, a plurality of energizing springs anchored to the cantilevered fingers of the anchor cage at one end so that the other end of the springs engage the phasing cage whereby all of the energizing springs act in concert on the phasing cage to bias all the rollers toward a clutch engaged position where the rollers are wedged between the races, and one race having notches formed by the plurality of circumferentially spaced clutch cam surfaces and the phasing cage having an end ring that has a plurality of nibs that are disposed in the notches to provide a barrier to lubrication escape from the roller clutch.

7. The one-way roller clutch as defined in claim 6 wherein the nibs are smaller than the notches so that the phasing cage can move with respect to the one race in the circumferential direction.

8. The one-way roller clutch as defined in claim 7 wherein the one race is the outer race and the nibs are at an outer margin of the end ring.

* * * * *